US012631663B2

(12) United States Patent
Ye

(10) Patent No.: US 12,631,663 B2
(45) Date of Patent: May 19, 2026

(54) SYSTEM AND METHOD FOR COMPENSATING WHEEL SPEED SENSOR SIGNAL LATENCY

(71) Applicant: GM GLOBAL TECHNOLOGY OPERATIONS LLC, Detroit, MI (US)

(72) Inventor: Shaochun Ye, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 645 days.

(21) Appl. No.: 18/133,572

(22) Filed: Apr. 12, 2023

(65) Prior Publication Data

US 2024/0345126 A1      Oct. 17, 2024

(51) Int. Cl.
| | |
|---|---|
| *G01P 3/487* | (2006.01) |
| *G01P 3/48* | (2006.01) |
| *G01P 3/489* | (2006.01) |

(52) U.S. Cl.
CPC ............ *G01P 3/487* (2013.01); *G01P 3/4805* (2013.01); *G01P 3/489* (2013.01)

(58) Field of Classification Search
CPC ......... G01P 3/489; G01P 3/4805; G01P 3/487
USPC ........................................... 702/148
See application file for complete search history.

(56) References Cited

U.S. PATENT DOCUMENTS 6,163,742 A * 12/2000 Shimizu ................. G01P 11/02
702/56

* cited by examiner

*Primary Examiner* — Aditya S Bhat

(57) ABSTRACT

A wheel speed sensor is configured to generate pulses based on teeth that rotate with a wheel passing the wheel speed sensor. A wheel speed module is configured to receive first and second pulses, retrieve from memory a previous compensated wheel speed determined for the second time, determine a measured wheel speed at the first time and a previous measured wheel speed at the second time based on the first and second pulses, and determine a present compensated wheel speed for the first time based on (a) the measured wheel speed at the first time, (b) the previous compensated wheel speed for the second time and (c) a measurement latency of the wheel speed sensor. A control module is configured to actuate an actuator of the vehicle based on the present compensated wheel speed.

20 Claims, 3 Drawing Sheets

SYSTEM AND METHOD FOR COMPENSATING WHEEL SPEED SENSOR SIGNAL LATENCY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to compensating signal latency, and more particularly to a system and a method for compensating wheel speed sensor signal latency.

Vehicles include a body and a set of wheels rotatably coupled to the body. A passenger of the vehicle may ride within the vehicle. The set of wheels may include two front wheels and two rear wheels.

The vehicle includes one or more torque producing devices, such as an internal combustion engine and/or an electric motor. The one or more torque producing devices drive the vehicle and more specifically, drives rotation of one or more of the wheels.

The vehicle includes one or more different type of sensors, such as sensors that sense the vehicle and sensors that sense a surrounding of the vehicle. One example of a sensor that senses the vehicle is a wheel speed sensor. The wheel speed sensor may be positioned at a rotor of a wheel in the set of wheels. The wheel speed sensor may sense a speed of the wheel.

SUMMARY

An example wheel speed system includes a wheel speed sensor, a wheel speed module, and a control module. The wheel speed sensor is configured to generate pulses based on teeth, respectively, that rotate with a wheel of a vehicle passing the wheel speed sensor. The pulses include a first pulse at a first time and a second pulse at a second time. The first time closer to a present time than the second time. The wheel speed module is configured to receive the first and second pulses, retrieve from memory a previous compensated wheel speed of the wheel determined for the second time, determine a measured wheel speed at the first time and a previous measured wheel speed at the second time based on the first and second pulses, and determine a present compensated wheel speed for the first time based on (a) the measured wheel speed at the first time, (b) the previous compensated wheel speed for the second time and (c) a measurement latency of the wheel speed sensor. The control module is configured to actuate an actuator of the vehicle based on the present compensated wheel speed.

In one example, the measurement latency exists between (a) a first time when one tooth of the teeth passes the wheel speed sensor and (b) a second time after the first time when the wheel speed sensor outputs the measured wheel speed.

In one example, the wheel speed module is configured to set the present compensated wheel speed for the first time based on 2 times the measured wheel speed at the first time minus the previous compensated wheel speed for the second time.

In one example, the wheel speed module is configured to communicate the measured wheel speed to a second control module via a network.

In one example, the wheel speed module is configured to determine the present compensated wheel speed for the first time based on (a) the measured wheel speed at the first time, (b) the measured wheel speed at the second time, (c) the previous compensated wheel speed for the second time, (d) the measurement latency of the wheel speed sensor, and (e) a communication latency.

In one example, the communication latency includes a period between (a) a first time when the wheel speed module outputs the measured wheel speed and (b) a second time when the second control module receives the measured wheel speed.

In one example. the wheel speed module is configured to determine the present compensated wheel speed for the first time based on 2 times the measured wheel speed at the first time minus the previous compensated wheel speed for the second time plus a measured wheel acceleration between the first and second times multiplied by an average communication latency between the wheel speed module and the second control module.

In one example, the wheel speed module is configured to limit an absolute value of a change in the present compensated wheel speed and the previous compensated wheel speed to less than or equal to an absolute value of a measured wheel acceleration between the first and second times multiplied by a maximum time delay between the first and second times.

In one example, when the measured wheel speed at the first time is greater than or equal to the previous measured wheel speed, the wheel speed module is configured to limit the present compensated wheel speed to greater than or equal to the previous compensated wheel speed.

In one example, when the measured wheel speed at the first time is less than or equal to the previous measured wheel speed, the wheel speed module is configured to limit the present compensated wheel speed to less than or equal to the previous compensated wheel speed.

An example method for compensated wheel speed signal latency is provided. The method includes generating pulses based on teeth, respectively, that rotate with a wheel of a vehicle passing a wheel speed sensor. The pulses include a first pulse at a first time and a second pulse at a second time. The first time closer to a present time than the second time. The method includes retrieving from memory a previous compensated wheel speed of the wheel determined for the second time. The method includes determining a measured wheel speed at the first time and a previous measured wheel speed at the second time based on the first and second pulses. The method includes determining a present compensated wheel speed for the first time based on (a) the measured wheel speed at the first time, (b) the previous compensated wheel speed for the second time and (c) a measurement latency of the wheel speed sensor. The method includes actuating an actuator of the vehicle based on the present compensated wheel speed.

In one example, the measurement latency exists between (a) a first time when one tooth of the teeth passes the wheel speed sensor and (b) a second time after the first time when the wheel speed sensor outputs the measured wheel speed.

In one example, the determining the present compensated wheel speed for the first time is based on 2 times the measured wheel speed at the first time minus the previous compensated wheel speed for the second time.

In one example, the method further comprises communicating the measured wheel speed to a second control module via a network.

In one example, the determining the present compensated wheel speed for the first time is based on (a) the measured wheel speed at the first time, (b) the measured wheel speed at the second time, (c) the previous compensated wheel speed for the second time, (d) the measurement latency of the wheel speed sensor, and (e) a communication latency.

In one example, the communication latency includes a period between (a) a first time when a wheel speed module outputs the measured wheel speed and (b) a second time when the second control module receives the measured wheel speed.

In one example, the determining the present compensated wheel speed for the first time is based on 2 times the measured wheel speed at the first time minus the previous compensated wheel speed for the second time plus a measured wheel acceleration between the first and second times multiplied by an average communication latency between the wheel speed module and the second control module.

In one example, the method further comprises limiting an absolute value of a change in the present compensated wheel speed and the previous compensated wheel speed to less than or equal to an absolute value of a measured wheel acceleration between the first and second times multiplied by a maximum time delay between the first and second times.

In one example, the method further comprising limiting the present compensated wheel speed to greater than or equal to the previous compensated wheel speed when the measured wheel speed at the first time is greater than or equal to the previous measured wheel speed.

In one example, the method further comprising limiting the present compensated wheel speed to less than or equal to the previous compensated wheel speed when the measured wheel speed at the first time is less than or equal to the previous measured wheel speed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles include a set of wheels. A wheel speed sensor may be positioned at each wheel. The wheel speed sensor measures a rotational speed (e.g., wheel speed) based on rotation of the one wheel. A measurement latency may exist between the wheel speed sensor measuring and outputting the wheel speed. In one example, a first control module may receive the wheel speed from the wheel speed sensor and communicate the wheel speed to a second control module.

A communication latency may exist in communicating the wheel speed to the second control module.

However, some operations of the vehicle rely on the wheel speed sensor signal at a precise time and thus rely on minimal latency. For example, a wheel slip mitigation system may mitigate vibrations caused by a slip of the wheel on a road surface. The vehicle may travel from a high mu (p) road surface to a low mu surface, and back to a high mu surface. The wheels of the vehicle may slip as a result of a change in mu of the road surface. Because the wheel slip mitigation system is configured to detect the slip using the wheel speed and mitigate vibrations caused by the slip, a reaction of the wheel slip mitigation system may be delayed due to the measurement and communication latency.

In view of the above, a system and method is provided for compensating a measurement latency and a communication latency of measured wheel speed.

Figure 1:
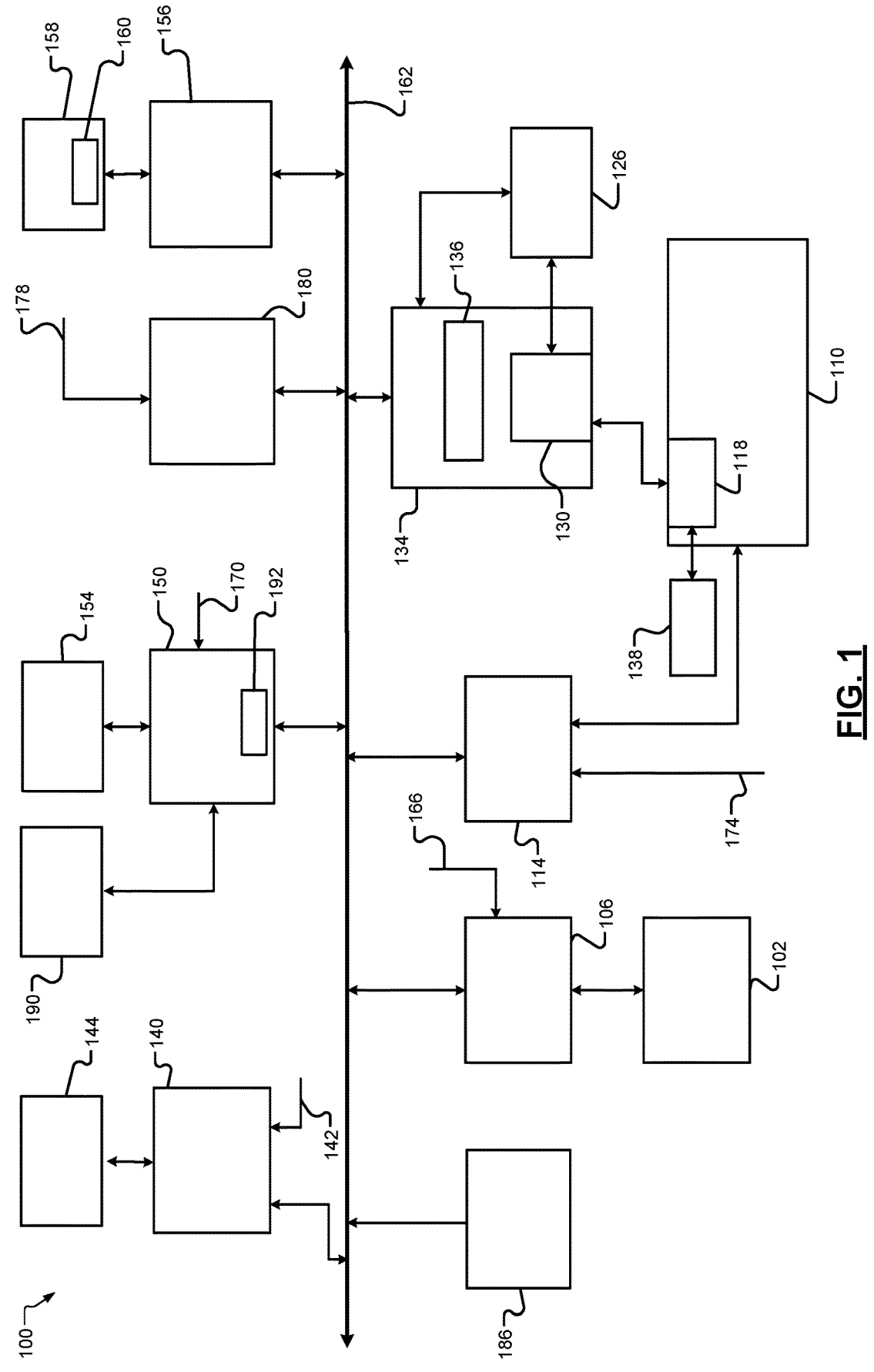
FIG. 1 is a functional block diagram of an example vehicle system.

Referring now to FIG. 1, a functional block diagram of an example vehicle system 100 is presented. While a vehicle system 100 for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system 100 may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may include, for example, an inverter. In one example, a lash management module 136 detects a lash between a driveline axle 138 and the wheel of the vehicle based on a speed of the driveline axle 138 and a speed of the wheel. When a lash is detected, the lash management module 136 controls the electric motor 118 and thereby the driveline axle 138 based on the speed of the driveline axle 138 and the speed of the wheel. The lash management module 136 is configured to reduce a difference between the speed of the driveline axle 138 and the speed the wheel of the vehicle and thus, mitigates the lash.

A steering control module 140 controls steering/turning of wheels of the vehicle, for example, based on driver turning of a steering wheel within the vehicle and/or steering commands from one or more vehicle control modules. A steering wheel angle (SWA) sensor (not shown) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system.

A brake control module 150 may selectively control (e.g., friction) brakes 154 of the vehicle based on one or more driver inputs, such as a brake pedal position (BPP) 170. A damper control module 156 controls damping of dampers 158 of the wheels, respectively, of the vehicle. The dampers 158 damp vertical motion of the wheels. The damper control module 156 may control, for example, damping coefficients of the dampers 158, respectively. For example, the dampers 158 may include magnetorheological dampers, continuous damping control dampers, or another suitable type of adjustable damper. The dampers 158 include actuators 160 that adjust damping of the dampers 158, respectively. In the example of magnetorheological dampers, actuators 160 may adjust magnetic fields applied to magnetorheological fluid within the dampers 158, respectively, to adjust damping.

Modules of the vehicle may share parameters via a network 162, such as a controller area network (CAN). A CAN may also be referred to as a car area network. For example, the network 162 may include one or more data buses. Various parameters may be made transmitted by a given module to other modules via the network 162.

The driver inputs may include, for example, an accelerator pedal position (APP) 166 which may be provided to the ECM 106. A brake pedal position (BPP) 170 may be provided to the brake control module 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle may include a plurality of external sensors and cameras, illustrated in FIG. 1 by 186. One or more actions may be taken based on input from the external sensors and cameras 186. For example, the infotainment module 183 may display video, various views, and/or alerts on a display via input from the external sensors and cameras 186 during driving.

The vehicle includes a wheel speed sensor 190 disposed at one of the wheels of the vehicle. The wheel speed sensor 190 measures a rotational speed of the one of the wheels (a wheel speed). One wheel speed sensor may be provided for each wheel of the vehicle and measure the wheel speed of that wheel. The wheel speed sensors may be electrically connected to a wheel speed module 192 of the brake control module 150. The wheel speed module 192 may communicate wheel speeds measured by the wheel speed sensor 190 to one or more other modules via the network 162.

The vehicle may include one or more additional control modules that are not shown, such as a chassis control module, a battery pack control module, etc. The vehicle may omit one or more of the control modules shown and discussed. Also, the vehicle may include one or more other types of sensors.

Figure 2:
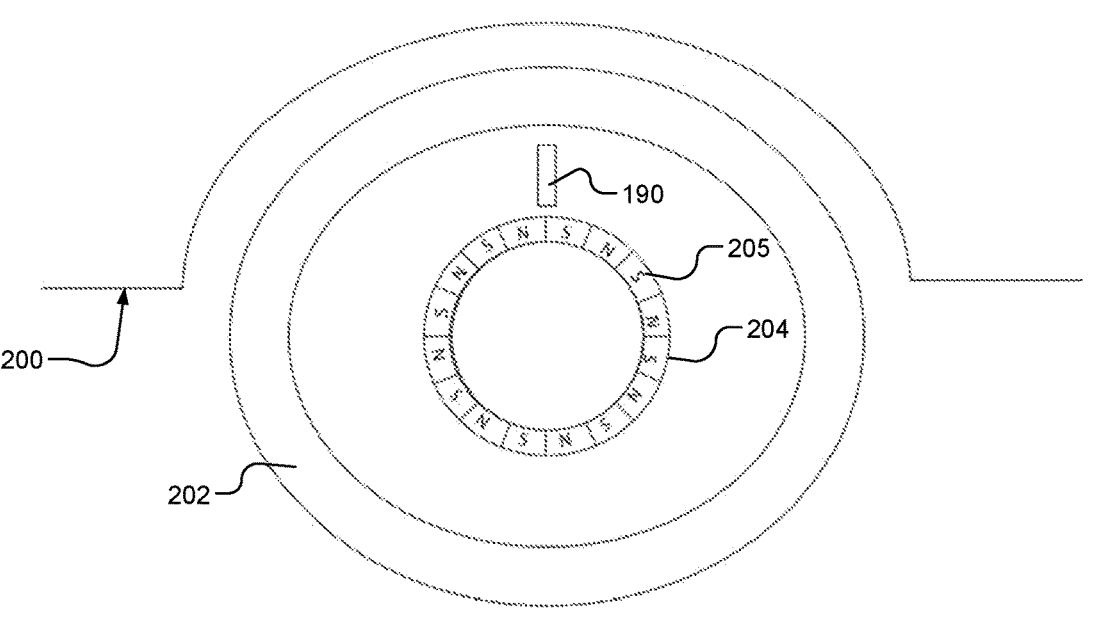
FIG. 2 is a schematic diagram of an example wheel speed sensor of a vehicle.

FIG. 2 is a schematic diagram of the example wheel speed sensor 190 of an example vehicle 200. The vehicle 200 includes a wheel 202. A wheel rotor 204 rotates with the wheel 202. In the illustrated example, the wheel rotor 204 includes a plurality of teeth 205 spaced equal distances apart on a radially outer surface of the wheel rotor 204 and the wheel speed sensor 190 may include a Hall effect sensor. The plurality of teeth 205 is represented as an alternating sequence between a first teeth shown as a north pole (N) and a second teeth shown as a south pole (S). The distance between each of the teeth 205 therefore corresponds to 360 degrees divided by the number of teeth 205. The wheel speed sensor 190 detects teeth passing the wheel speed sensor 190 and determines the measured wheel speed based on the time period between two teeth passing the wheel speed sensor 190 and the distance between teeth.

The wheel speed module 192 receives the measured wheel speed from the wheel speed sensor 190 and the other wheel speed sensors. However, a measurement latency exists between (a) the time when the tooth 205 of the wheel rotor 204 passes the wheel speed sensor 190 and (b) the time when the wheel speed sensor 190 outputs the measured wheel speed. In one example, the brake control module 150 may actuate the brakes 154, such as to prevent locking of the brakes 154, based on one or more of the wheel speeds. In another example, the brake control module 150 may communicate the measured wheel speed to a second control module (e.g., the ECM 106, the TCM 114, and the PIM 134), using the network 162. A communication latency exists between (a) the time when the wheel speed sensor 190 can output the measured wheel speed and (b) the time when the second control module receives the measured wheel speed via the network 162.

Figure 3:
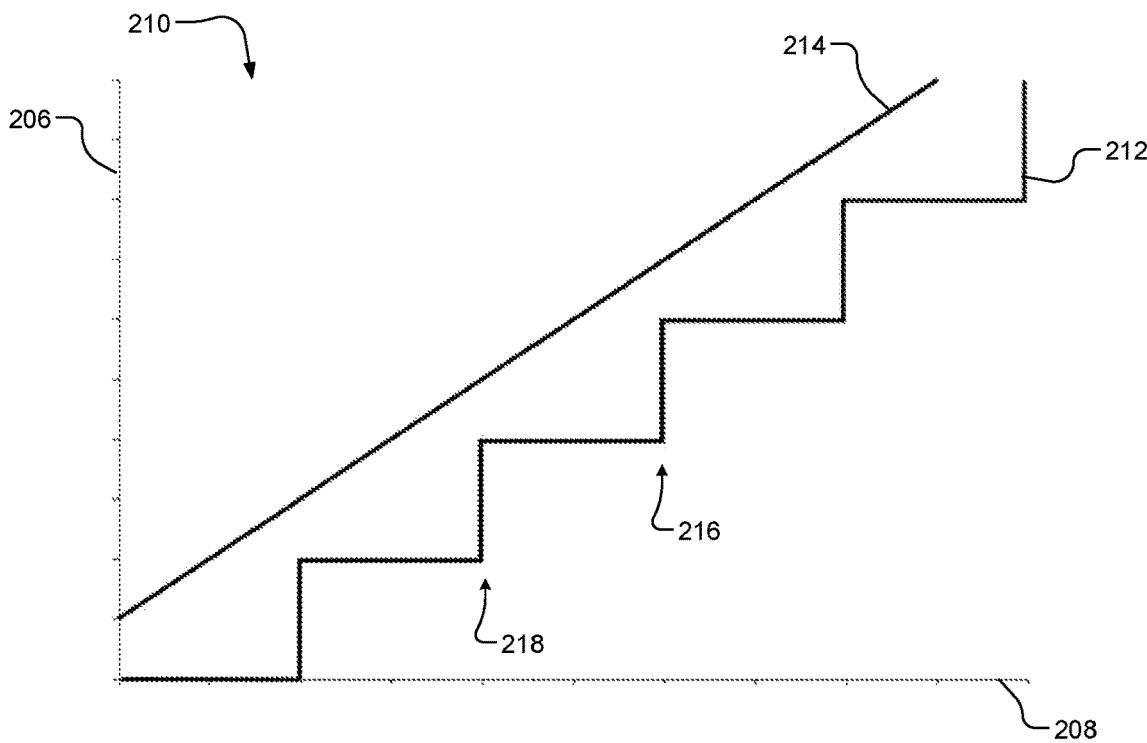
FIG. 3 is a plot including a wheel speed sensor signal and an actual wheel speed curve.

FIG. 3 is a graph 210 of wheel speed 206 over time 208. Trace 212 tracks a measured wheel speed from the wheel speed sensor 190. Trace 214 tracks an actual wheel speed of that wheel. The measured wheel speed may have a rectangular wave form as a result of the use of the detection of the teeth as the measured wheel speed may be updated each time a tooth passes the wheel speed sensor. As such, changes in the measured wheel speed may appear as pulses or steps in the measured wheel speed from the wheel speed sensor. The pulses may include a first or present pulse 216 at a first time and a second or previous pulse 218 at a second time. The first time is closer to a present time than the second time. As illustrated, the actual wheel speed may change more frequently.

In the present disclosure, a wheel speed system is provided for compensating measurement and communication latency in the measured wheel speed.

Equation 1 may be used (e.g., by the wheel speed module 192 of the brake control module 150) to determine the measured wheel speed at the present pulse 216 (e.g., a present measured wheel speed), $N_{ws}(n)$ generated by the wheel speed sensor 190 in response to a tooth passing the wheel speed sensor 190. Measured wheel speed can be determined by the wheel speed module 192 by dividing a change in angle (rotational position), $\Delta\theta$, of the wheel by a change in time, $\Delta t$ (a period). The change in angle is the difference between an angle/position at the present pulse 216, $\theta(n)$, and an angle/position at the previous pulse 218, $\theta(n-1)$. If the teeth are equally spaced, the change in angle between two adjacent teeth is equal to 360 degrees divided by the total number of teeth. The change in time is the difference between the present pulse time, t(n), and the previous pulse time, t(n−1).

$$N_{ws}(n) = \frac{\theta(n) - \theta(n-1)}{r(n) - t(n-1)} = \frac{\Delta\theta}{\Delta t} \qquad \text{Equation 1}$$

To compensate for the measurement latency, an acceleration of the wheel 202 may be assumed to be constant between the present and previous pulses 216, 218. Assuming the acceleration between the present and previous pulses 216, 218 is constant may theoretically remove the measurement latency. Accordingly, the measured wheel speed may be determined by the wheel speed module 192 using Equation 2. The measured wheel speed at the present pulse 216, $N_{ws}(n)$, may be based on or approximately equal to an average of an actual wheel speed at the previous pulse 218 (e.g., previous actual wheel speed), $N_w(n-1)$, and an actual wheel speed at the present pulse 216 (e.g., present actual wheel speed), $N_w(n)$.

$$N_{ws}(n) = \frac{N_w(n-1) + N_w(n)}{2} \qquad \text{Equation 2}$$

Equation 2 may be rearranged/rewritten as Equation 3 below. The wheel speed module 192 may set the actual wheel speed at the present pulse 216, $N_w(n)$, based on or equal to a two multiplied by the measured wheel speed at the present pulse 216 minus the actual wheel speed at the previous pulse 218.

$$N_w(n) = 2 * N_{ws}(n) - N_w(n-1) \qquad \text{Equation 3}$$

To replace the actual wheel speed with a compensated wheel speed, Equation 3 can be rewritten as Equation 4 and solved by the wheel speed module 192. The wheel speed module 192 may set a compensated wheel speed at the present pulse 216 (e.g., present compensated wheel speed), $N_{wc}(n)$, based on or equal to two multiplied by the measured wheel speed at the present pulse 216 minus a compensated wheel speed at the previous pulse 218 (e.g., previous compensated wheel speed), $N_{wc}(n-1)$. Equation 4 may be referred to as a measurement latency expression and compensates for the measurement latency.

$$N_{wc}(n) = 2 * N_{ws}(n) - N_{wc}(n-1) \qquad \text{Equation 4}$$

To compensate for the communication latency, the acceleration of the wheel 202 may be assumed to be constant between the present and previous pulses 216, 218 and during a communication time period. The communication time period is a time period from when (a) the wheel speed sensor 190 communicates the wheel speed and (b) the second control module receives the wheel speed. Additionally, the communication latency is assumed to be constant between the present and previous pulses 216, 218. Accordingly, the wheel speed module 192 may set the compensated wheel speed at the present pulse 216 based on or using Equation 5 which adds a communication latency expression, $\Delta N_{wc}(n)$, to the measurement latency expression of Equation 4.

$$N_{wc}(n) = 2 * N_{ws}(n) - N_{wc}(n-1) + \Delta N_{wc}(n) \qquad \text{Equation 5}$$

The communication latency expression, $\Delta N_{wc}(n)$, may represent a change in the compensated wheel speed and may be determined by the wheel speed module 192 based on or using Equation 6, below. As provided in Equation 6, the communication latency expression may be set by the wheel speed module 192 based on or equal to the change in the measured wheel speed divided by the change in time and multiplied by an average communication latency, $\Delta t_c$. The change in the measured wheel speed is the difference between the measured wheel speed at the present pulse 216, $N_{ws}(n)$, and the measured wheel speed at the previous pulse 218 (e.g., previous measured wheel speed), $N_{ws}(n-1)$. The change in time (period) is a difference between the present pulse time, t(n), and the previous pulse time, t(n−1). The average communication latency may be a predetermined communication latency value set based on a communication rate between the brake control module 150 and the second control module. For example, the average communication latency may be approximately 5 milliseconds (ms), or another suitable average communication latency.

$$N_{wc}(n) = 2 * N_{ws}(n) - N_{wc}(n-1) + \frac{N_{ws}(n) - N_{ws}(n-1)}{r(n) - t(n-1)} * \Delta t_c \qquad \text{Equation 6}$$

To ensure the compensated wheel speed derived using Equation 4 and Equation 6 is stable and converged to the actual wheel speed, one or more constraints may be applied by the wheel speed module 192 in determining the compensated wheel speed. In the example of compensating measurement latency using Equation 4, a first constraint that may be applied by the wheel speed module 192 may be represented by Equation 7. The first constraint may be the wheel speed module 192 limiting a difference between the compensated wheel speed at the present pulse 216 and the compensated wheel speed at the previous pulse 218 to less than or equal to a measured wheel acceleration between the present and previous pulses 216, 218 multiplied by a change in time between the present and previous pulses 216, 218.

In the example of compensating measurement and communication latency using Equation 6, the first constraint that may be applied by the wheel speed module 192 may be represented by Equation 8. The first constraint may be the wheel speed module 192 limiting a difference between the compensated wheel speed at the present pulse 216 and the compensated wheel speed at the previous pulse 218 to less than or equal to a measured wheel acceleration between the present and previous pulses 216, 218 multiplied by a maximum time delay.

$$|N_{wc}(n) - N_{wc}(n-1)| \leq \left| \frac{N_{ws}(n) - N_{ws}(n-1)}{t(n) - t(n-1)} * (t(n) - t(n-1)) \right| \qquad \text{Equation 7}$$

$$|N_{wc}(n) - N_{wc}(n-1)| \leq \qquad \text{Equation 8}$$
$$\left| \frac{N_{ws}(n) - N_{ws}(n-1)}{t(n) - t(n-1)} * (t(n) - t(n-1) + \Delta t_{cmax}) \right|$$

A change in the compensated wheel speed may be set by the wheel speed module 192 based on or equal to a difference between the compensated wheel speed at the present pulse 216 and the compensated wheel speed at the previous pulse 218. A change in the measured wheel speed may be set by the wheel speed module 192 based on or equal to a difference between the measured wheel speed at the present pulse 216 and the measured wheel speed at the previous pulse 218. A change in time (period) may be a difference between the time of generation of the present pulse 216 and the time of generation of the previous pulse 218. The measured wheel acceleration may be represented by a change in the measured wheel speed between two times divided by the change in time between the two times.

As provided in Equation 7, the first constraint is satisfied when an absolute value of the change in the compensated wheel speed is less than or equal to the absolute value of the acceleration multiplied by the change in time.

The maximum time delay, as provided in Equation 8, is represented by the product of a maximum communication latency, $\Delta t_{cmax}$, and the change in time between the present pulse 216 and the previous pulse 218. The first constraint is satisfied when an absolute value of the change in the compensated wheel speed is less than or equal to the absolute value of the acceleration multiplied by the maximum time delay.

A second constraint may be applied by the wheel speed module 192. The second constraint limits the compensated wheel speed to the same direction (e.g. increasing or decreasing) as the measured wheel speed.

When the measured wheel speed at the present pulse 216 is greater than or equal to the measured wheel speed at the previous pulse 218, the second constraint limits the compensated wheel speed at the present pulse 216 to be greater than or equal to the compensated wheel speed at the previous pulse 218, as shown by Expression 9.

$$N_{ws}(n) \geq N_{ws}(n-1), N_{wc}(n) \geq N_{wc}(n-1) \qquad \text{Equation 9}$$

When the measured wheel speed at the present pulse 216 is less than or equal to the measured wheel speed at the previous pulse 218, the second constraint limits the compensated wheel speed at the present pulse 216 to be less than or equal to the compensated wheel speed at the previous pulse 218, as shown by Expression 10.

$$N_{ws}(n) \leq N_{ws}(n-1), N_{wc}(n) \leq N_{wc}(n-1) \qquad \text{Equation 10}$$

Figure 4:
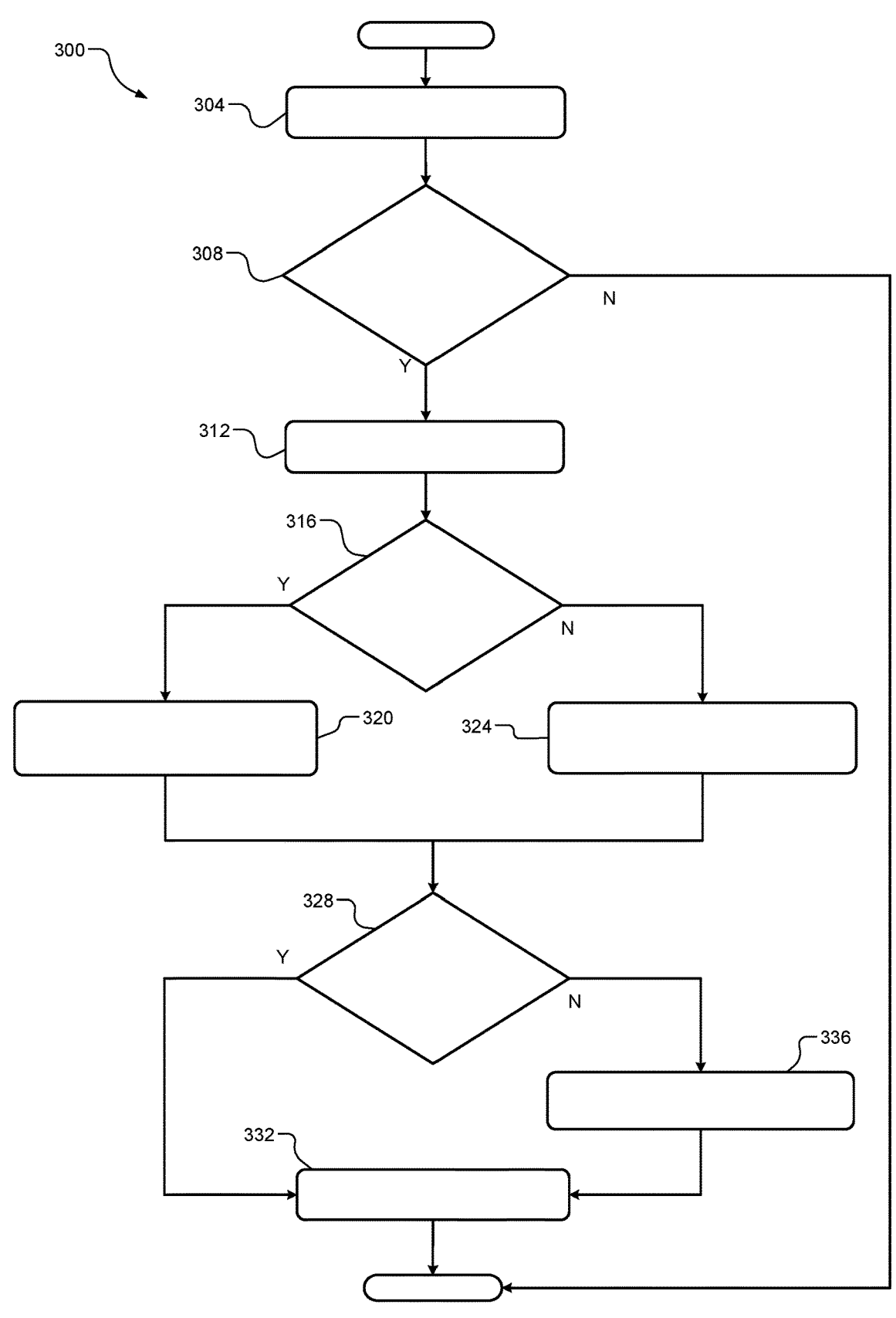
FIG. 4 is a flow chart depicting an example method for compensating wheel speed sensor signal latency.

FIG. 4 is a flow chart depicting an example method of the wheel speed module 192 compensating latency of the wheel speed and determining a compensated wheel speed of the wheel. The method is repeated for each pulse generated by the wheel speed sensor 190. The method begins at 304 where the wheel speed sensor 190 generates pulses based on rotation of the wheel as discussed above. The wheel speed sensor 190 may generate a pulse each time when a tooth passes the wheel speed sensor 190.

At 308, the wheel speed module 192 determines whether the output signal of the wheel speed sensor includes at least two pulses. The last pulse generated by the wheel speed sensor 190 can be used by the wheel speed module 192 as the present pulse 216, and the pulse generated immediately before the last pulse can be used by the wheel speed module 192 as the previous pulse 218. If the output signal does not include at least two pulses, the method ends. If the output signal does include at least two pulses, the method continues to step 310.

At 312, the wheel speed module 192 retrieves a compensated wheel speed determined by the wheel speed module 192 for the previous pulse 218 from memory. The compensated wheel speed of the previous pulse 218 represents the speed of the wheel 202 at the time of the previous pulse 218.

At 316, the wheel speed module 192 may determine whether the wheel speed is to be communicated to a second control module. In various implementations, the wheel speed may always be communicated to one or more other control modules. Examples of the second control module include the ECM 106, the TCM 114, the PIM 134 or another suitable module. If the wheel speed is to be communicated to the second control module, there is a communication latency and method continues to 320. If the wheel speed is not to be communicated to any second control module, there may only be a measurement latency in the wheel speed and the method may continue to 324.

At 320, the wheel speed module 192 calculates a compensated wheel speed at the present pulse 216 using Equation 6 described above. The wheel speed module 192 compensates for measurement latency and communication latency using Equation 6. At 324, the wheel speed module 192 calculates a compensated wheel speed at the present pulse 216 using Equation 4 described above. The wheel speed module 192 compensated for measurement latency using Equation 4.

At 328, the wheel speed module 192 determines whether the compensated wheel speed is within the first constraint and the second constraint. The first constraint is represented as Equation 7 when compensating for measurement latency only and represented as Equation 8 when compensating for the measurement and communication latency. The second constraint is represented as Expression 9 when the measured wheel speed at the present pulse 216 is greater than or equal to the measured wheel speed at the previous pulse 218 and Expression 10 when the measured wheel speed at the present pulse 216 is less than or equal to the measured wheel speed at the previous pulse 218.

If the compensated wheel speed is within the first and second constraints, the compensated wheel speed may be an accurate representation of the actual wheel speed and the method continues to 332.

If the compensated wheel speed is not within at least one of the first and second constraints, the compensated wheel speed may not be an accurate representation of the actual wheel speed and the method continues to 336. At 336, the wheel speed module 192 limits the compensated wheel speed to be within the first and second constraints.

The above is done for each wheel speed sensor. At 332, the one or more control modules actuate one or more actuators of the vehicle based on the compensated wheel speed. In one example, the brake control module 150 may actuate one or more of the brakes 154 of the vehicle 200 based on one or more of the compensated wheel speeds. In another example, the power inverter module (PIM) 134 may control the electric motor 118 based on one or more of the compensated wheel speeds. In yet another example, the lash management module 146 may control the electric motor 118 when a lash is detected based on one or more of the compensated wheel speeds.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A wheel speed system comprising:

a wheel speed sensor configured to generate pulses based on teeth, respectively, that rotate with a wheel of a vehicle passing the wheel speed sensor, the pulses including a first pulse at a first time and a second pulse at a second time, the first time closer to a present time than the second time;

a wheel speed module configured to:

receive the first and second pulses;

retrieve from memory a previous compensated wheel speed of the wheel determined for the second time;

determine a measured wheel speed at the first time and a previous measured wheel speed at the second time based on the first and second pulses; and determine a present compensated wheel speed for the first time based on (a) the measured wheel speed at the first time, (b) the previous compensated wheel speed for the second time and (c) a measurement latency of the wheel speed sensor; and a control module configured to actuate an actuator of the vehicle based on the present compensated wheel speed.

2. The wheel speed system of claim 1, wherein the measurement latency exists between (a) a first time when one tooth of the teeth passes the wheel speed sensor and (b) a second time after the first time when the wheel speed sensor outputs the measured wheel speed.

3. The wheel speed system of claim 1, wherein the wheel speed module is configured to set the present compensated wheel speed for the first time based on 2 times the measured wheel speed at the first time minus the previous compensated wheel speed for the second time.

4. The wheel speed system of claim 1, wherein the wheel speed module is configured to communicate the measured wheel speed to a second control module via a network.

5. The wheel speed system of claim 4, wherein the wheel speed module is configured to determine the present compensated wheel speed for the first time based on (a) the measured wheel speed at the first time, (b) the measured wheel speed at the second time, (c) the previous compensated wheel speed for the second time, (d) the measurement latency of the wheel speed sensor, and (c) a communication latency.

6. The wheel speed system of claim 5, wherein the communication latency includes a period between (a) a first time when the wheel speed module outputs the measured wheel speed and (b) a second time when the second control module receives the measured wheel speed.

7. The wheel speed system of claim 6, wherein the wheel speed module is configured to determine the present compensated wheel speed for the first time based on 2 times the measured wheel speed at the first time minus the previous compensated wheel speed for the second time plus a measured wheel acceleration between the first and second times multiplied by an average communication latency between the wheel speed module and the second control module.

8. The wheel speed system of claim 1, wherein the wheel speed module is configured to limit an absolute value of a change in the present compensated wheel speed and the previous compensated wheel speed to less than or equal to an absolute value of a measured wheel acceleration between the first and second times multiplied by a maximum time delay between the first and second times.

9. The wheel speed system of claim 1, wherein, when the measured wheel speed at the first time is greater than or equal to the previous measured wheel speed, the wheel speed module is configured to limit the present compensated wheel speed to greater than or equal to the previous compensated wheel speed.

10. The wheel speed system of claim 1, wherein when the measured wheel speed at the first time is less than or equal to the previous measured wheel speed, the wheel speed module is configured to limit the present compensated wheel speed to less than or equal to the previous compensated wheel speed.

11. A method for compensated wheel speed signal latency, the method comprising:

generating pulses based on teeth, respectively, that rotate with a wheel of a vehicle passing a wheel speed sensor, the pulses including a first pulse at a first time and a second pulse at a second time, the first time closer to a present time than the second time;

retrieving from memory a previous compensated wheel speed of the wheel determined for the second time;

determining a measured wheel speed at the first time and a previous measured wheel speed at the second time based on the first and second pulses;

determining a present compensated wheel speed for the first time based on (a) the measured wheel speed at the first time, (b) the previous compensated wheel speed for the second time and (c) a measurement latency of the wheel speed sensor; and actuating an actuator of the vehicle based on the present compensated wheel speed.

12. The method of claim 11, wherein the measurement latency exists between (a) a first time when one tooth of the teeth passes the wheel speed sensor and (b) a second time after the first time when the wheel speed sensor outputs the measured wheel speed.

13. The method of claim 11, wherein the determining the present compensated wheel speed for the first time is based on 2 times the measured wheel speed at the first time minus the previous compensated wheel speed for the second time.

14. The method of claim 11, further comprising communicating the measured wheel speed to a second control module via a network.

15. The method of claim 14, wherein the determining the present compensated wheel speed for the first time is based on (a) the measured wheel speed at the first time, (b) the measured wheel speed at the second time, (c) the previous compensated wheel speed for the second time, (d) the measurement latency of the wheel speed sensor, and (c) a communication latency.

16. The method of claim 15, wherein the communication latency includes a period between (a) a first time when a wheel speed module outputs the measured wheel speed and (b) a second time when the second control module receives the measured wheel speed.

17. The method of claim 16, wherein the determining the present compensated wheel speed for the first time is based on 2 times the measured wheel speed at the first time minus the previous compensated wheel speed for the second time plus a measured wheel acceleration between the first and second times multiplied by an average communication latency between the wheel speed module and the second control module.

18. The method of claim 11, further comprising limiting an absolute value of a change in the present compensated wheel speed and the previous compensated wheel speed to less than or equal to an absolute value of a measured wheel acceleration between the first and second times multiplied by a maximum time delay between the first and second times.

19. The method of claim 11, further comprising limiting the present compensated wheel speed to greater than or equal to the previous compensated wheel speed when the measured wheel speed at the first time is greater than or equal to the previous measured wheel speed.

20. The method of claim 11, further comprising limiting the present compensated wheel speed to less than or equal to the previous compensated wheel speed when the measured wheel speed at the first time is less than or equal to the previous measured wheel speed.

\* \* \* \* \*